United States Patent [19]
Dalmasso

[11] 3,947,821
[45] Mar. 30, 1976

[54] MICROPROGRAMMING APPARATUS AND METHOD

[75] Inventor: Ginette Laure Dalmasso, Bagnolet, France

[73] Assignee: Compagnie Honeywell Bull, Paris, France

[22] Filed: Oct. 18, 1974

[21] Appl. No.: 515,905

[30] Foreign Application Priority Data
Oct. 24, 1973  France .............................. 73.37868

[52] U.S. Cl. ............................................ 340/172.5
[51] Int. Cl.² .......................................... G06F 9/16
[58] Field of Search ................................ 340/172.5

[56] References Cited
UNITED STATES PATENTS

| | | | |
|---|---|---|---|
| 3,391,394 | 7/1968 | Ottaway et al. .................. | 340/172.5 |
| 3,792,441 | 2/1974 | Wymore et al. .................. | 340/172.5 |

*Primary Examiner*—Raulfe B. Zache
*Attorney, Agent, or Firm*—Lowe, King, Price & Markva

[57] ABSTRACT

The disclosure describes improved techniques for using a general or parametered microinstruction for more than one application. A read/write store provides at a first address a storage location for the parametered microinstruction. The parametered microinstruction is calculated according to data values stored in a table in order to accommodate the various applications. In one embodiment, an arithmetic and logic unit combines first and second values from the table in order to form or calculate a microinstruction having first and second parameters. The calculated microinstruction then is stored in the read/write store at the first address. This techniques enables the calculated microinstruction to be carried out in the same manner as non-parametered microinstructions.

12 Claims, 2 Drawing Figures

MICROPROGRAMMING APPARATUS AND METHOD

RELATED APPLICATION

Priority is claimed in accordance with 35 U.S.C. 119 under French application No. 73 37868 filed Oct. 24, 1973.

BACKGROUND AND SUMMARY OF THE INVENTION

The present invention relates to data processing and relates more particularly to the technique of microprogramming in a processor which has a central store.

Microprogramming enables a mnemonic machine code followed by a certain number of effective parameters to be substituted for a certain group of instructions in a program. Corresponding to this code is a special program termed a microprogram which carries out a specific function on data associated with the parameters and which consists of a certain number of instructions termed microinstructions. The meaning of the parameters is given by formal parameters which become apparent when the microprogram is drawn up. The parameters may be introduced in a number of ways and they generally take the form of a list of symbols separated by commas which are used in the microinstructions contained in the microprogram. A substitution is then made during operation by taking homologous symbols from the list of effective parameters.

Generally speaking, such microprograms are generated and recorded beforehand in a control store. Each microprogram corresponds to a specific type of application; for example, $n$ types of applications will have associated with them $n$ microprograms. Depending on the value of $n$ and the size of each microprogram, the control store may become relatively full.

However, in certain cases, the general flowchart represented by a microprogram may be applied to a number of applications of the same type with only the content of certain microinstructions differing from one application to another.

The object of the present invention is to make it possible to have a single microprogram for a number of applications of the same type by using parametered microinstructions.

Thus, a microprogram according to the present invention may comprise a succession of microinstructions certain of which will be stored in parametered form. The parametered microinstructions are formed by combining data to form calculated microinstructions which are capable of being carried out and which differ to suit the selected application.

According to one feature of the present invention a preferred method of recording and carrying out microprograms would comprise the following steps:

recording in a read/write store, a general microprogram which contains at least one parametered microinstruction written in parametered form and a data table containing at least the various values of the parameters in the parametered microinstruction, when the parametered microinstruction is addressed by the microprogram being carried out, calculating or constructing the parametered microinstruction with values of the parameters extracted from the data table to form a calculated microinstruction, storing the calculated microinstruction in the store, and carrying out the calculated microinstruction.

According to another feature of the invention, apparatus for recording and carrying out microprograms in a processor associated with a data-processing system would comprise:

a read/write store for storing a microprogram including microinstructions written in parametered form and for storing a data table containing the values of the parameters of the parametered microinstructions, microinstruction address registers the outputs of which are connected to the selection circuits of the store, and means which enable a parametered microinstruction to be calculated as a function of the corresponding values of the parameters in the data table and which enable this calculated microinstruction to be recorded at a store address that enables execution in a normal way.

One embodiment of the present invention consists of an assembly of registers and individual units; these being a main store, a control store which contains the microprograms and a control unit which controls and gives instructions for the operations which we requested. The instructions are carried out by a processing unit of the processing in question is logic or arithmetical, and by an exchange unit if the transfer of data to the outside is involved.

DESCRIPTION OF THE DRAWINGS

Further advantages, details and features will become more apparent in the course of the explanatory description which follows and with reference to the accompanying schematic drawings which are given solely by way of example to illustrate one embodiment, and in which.

DESCRIPTION OF THE PREFERRED EMBODIMENT

Figure 1:
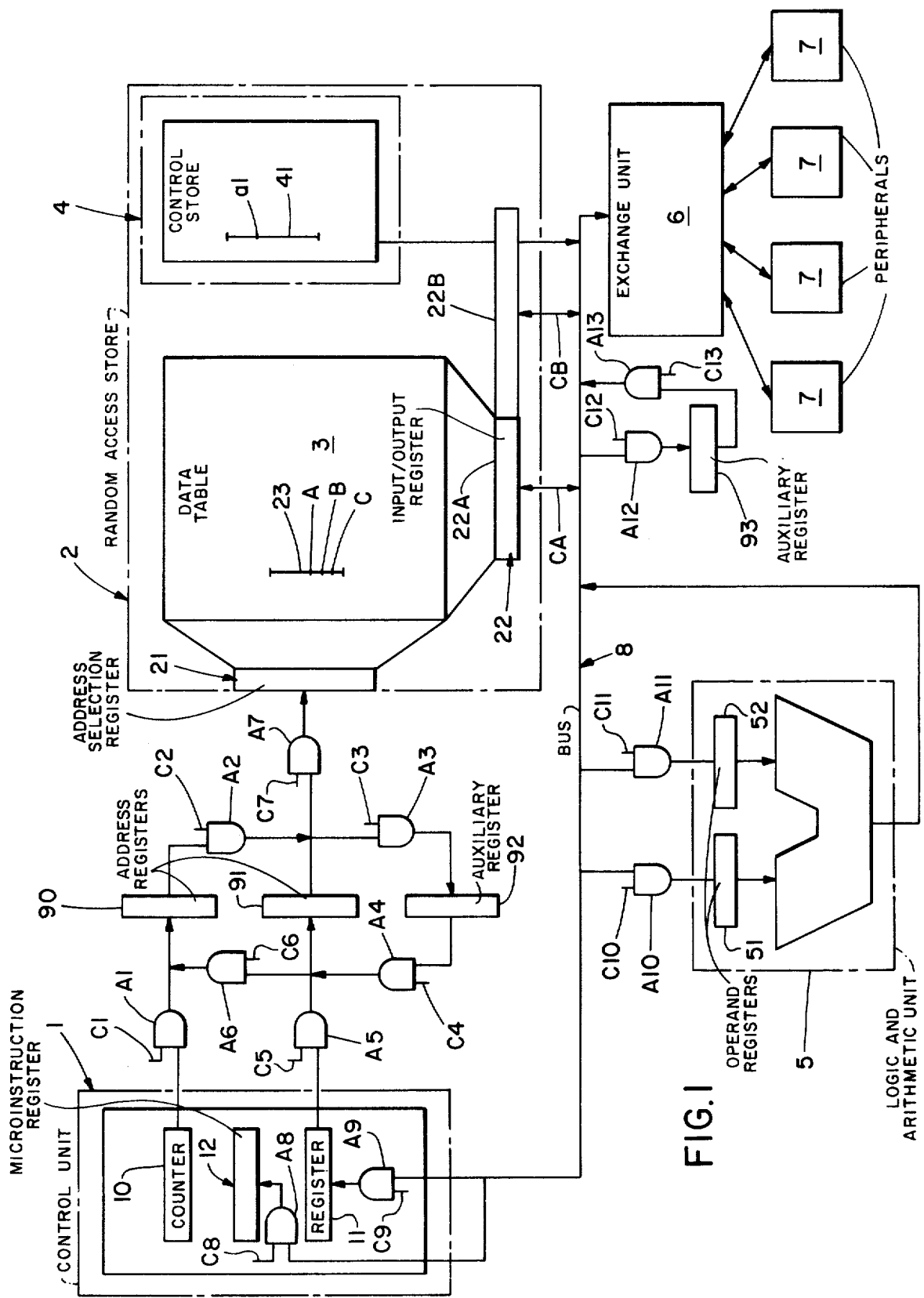
FIG. 1 is a block diagram of one embodiment of apparatus according to the invention.

In FIG. 1 are shown:

a control unit 1 which comprises a register or ordinal counter 10, a register or microinstruction register 12, and a register 11 pointing to table 23 which receives signals through an AND gate A9, a read/write or random access central store 2 comprising an address selection register 21, an input/output register 22 divided into two 8-bit fields 22A and 22B, and a data table 23 which is recorded in a zone 3 of the store that is accessible to the user, a control store 4 where microprogram 41 has previously been recorded, the section of this control store where microprogram 41 is recorded being a section of the main store 2, a logic and arithmetic unit 5 including two operand registers 51 and 52, which are connected to a bus 8 by AND gates A10, A11, respectively, at least one exchange unit or connecting member 6 which is linked to peripherals 7.

These various units are connected together by a bus 8 which forms a connection between the various units.

a certain number of registers, namely:

a register 90 which is to contain the address of the microinstruction which is to be carried out, which address is read from store. This register is connected at the input side to register 10 through an AND gate A1 and at the output side to the input of register 21 through AND gates A2, A7, a register 91 which is to contain the central store address of the data to be read in or out. At the input side this register is connected to register 11 through AND gate A5, and at the output side to the input of register 21 through AND gate A7, an auxiliary register 92 which is intended to hold the address of a parametered microinstruction during the processing to which it is subjected and before it is executed. This register is connected at the input side to register 90 through AND gates A2, A3 and at the output side to the inputs of registers 90 and 91 through AND gates A4, A6, an auxiliary working register 93 which is intended to hold a byte of data required to generate the parametered microinstruction. Register 93 has an input connected to bus 8 through an AND gate A12 and an output connected to bus 8 through an AND gate A13.

AND gates A1–A13 are controlled by the logic signals applied to conductors C1–C13, respectively, by control unit 1. AND gates A1–A13 have as many inputs as the connected portions of registers 10, 11 and 90–92 have storage cells or bits. AND gates A1–A13 are merely examples of logic circuitry which can be use to implement the present invention.

In order to initialize the system, a microprogram used to carry out a set of microinstructions is written into segment 41 of control store 4. The microprogram includes a storage location at address a1 into which a parametered microinstruction may be written. Data values used to calculate the parametered microinstruction for different applications are stored in table 23. As a result, the same microprogram can be used for different applications.

When the first microinstruction in segment 41 is to be executed, its address is in register 10. AND gates A1, A2, A7 are switched to their on states so that the address is transferred to registers 90 and 21. The first microinstruction is then read out of segment 41 into register 22. After the first microinstruction is executed, register 10 is indexed or incremented by 1 so that the address of the second microinstruction in segment 41 is stored in registers 90 and 21. Each microinstruction in segment 41 is addressed in the foregoing manner until address a1 is reached.

When parametered microinstruction M1 situated at an address a1 is reached, the said microinstruction will be subjected to processing to put it into a form capable of being carried out using parameters characteristic of a predetermined application.

The address a1 of the microinstruction is first of all fed into register 92 by turning on AND gates A2, A3.

The values of the parameters associated with microinstruction M1 are found in a data table 23 and are then transmitted to operand registers 51 and 52 via register 22 and bus 8, before they are processed by the logic and arithmetical unit 5 so as to give an executable microinstruction which is characteristic of the said application.

Before being carried out, this microinstruction, which at this stage is treated as data, needs to be stored in store 4 at address a1. This operation is carried out by means of register 91, which should contain the address at which it is desired that the data which is stored in register 22 should be read in. For this purpose, the contents of register 92, which contains address a1, are fed to register 91 by switching AND gate A4 to its on state.

The microinstruction is thus not considered as a item of data, but rather as a microinstruction which is stored at address a1. The execution of this microinstruction is caused by register 90, which needs to contain the address of the microinstruction to be carried out, and thus register 90 has fed to it the contents of the register 92 which contains address a1. This transfer is achieved by switching on AND gates A4, A6.

Once microinstruction M1 has been carried out, microprogram 41 carries on in sequence and passes on to the next microinstruction, which may or may not be parametered.

The present invention is applicable, inter alia, to the microdiagnosis of logic units connected to an input-/output processor. Such logic units may be used to connect together various types of apparatus and may, for example, consist of a series of addressable registers which may be read into, or from, by means of microinstructions under the control of the processor.

A parametered microinstruction for a given type of application may equally well define a logic or arithmetical operation (addition, substraction, etc.) or an input-/output operation (reading into or from a register).

As an example, let it be assumed that the structure of the microinstructions of the following form:

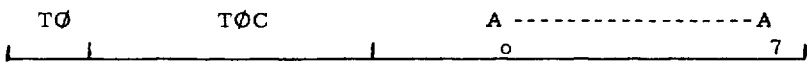

in which T$\phi$ is a 4 bit character representing the nature of the operation, T$\phi$C is a 4 bit character representing the type of operation, and $A_o$ - - - $A_7$ is an 8 bit byte representing a register involved in the operation.

Let the type of application involved be one which calls for an input/output operation and in particular for a data item to be read into a register associated with a logic unit.

When parametered microinstruction M1 is processed, the values for the parameters will be found in the data table 23 and, after processing carried out in the logic and arithmetical unit 5:

T$\phi$ will assume a value equivalent to an input/output operation,

T$\phi$C will specify that the operation in question is a reading in operation, and $A_o$ - - - $A_7$ will indicate the number of the register involved in the operation. Bit $A_o$ also many indicate a read or write operation. More specifically, $A_o$ - - - $A_7$, T$\phi$ and T$\phi$C are stored in table 23 at consecutive addresses A, B and C, respectively. The first of these addresses is stored in register 11. The non-parametered microinstructions in segment 41 are then executed as previously described. When address a1 appears in register 10, it is recognized as the address of a parametered microinstruction and is transferred to register 92 by turning on AND gates A2, A3. AND gates A9, A7 and A12 are then turned on so that $A_o$ - - - $A_7$ is read from address A of table 23 into register 93. Register 11 is incremented and AND gates A5, A7 and A10 are then turned on so that T$\phi$ is read from address B in table 23 into operand register 51. Register 11 again is incremented and AND gates A5, A7 and A11 are then turned on so that T$\phi$C is read from address C in table 23 into operand register 52.

Unit 5 performs an arithmetic or logical operation on Tφ and TφC so that an 8 bit Tφ – TφC byte having the form

| Tφ | TφC | is generated. The Tφ – TφC is transferred through channel CA into register field 22A by logic circuitry not shown. $A_0$ - - - $A_7$ then is transferred through AND gate A13 and channel CB to register field 22B. Address $a1$ is transferred to register 91 through AND gate A4, and is transferred to register 21 through AND gate A7 so that the 16 bit calculated microinstruction in register 22 is stored at address $a1$ in segment 41. Address $a1$ then is transferred from register 92 through AND gates A4, A6 and is stored in register 90. AND gates A2, A7 then are turned on so that the 16 bit calculated microinstruction stored at address $a1$ in segment 41 is read into register 22 and transferred into register 12 for execution through AND gate A8.

Figure 2:
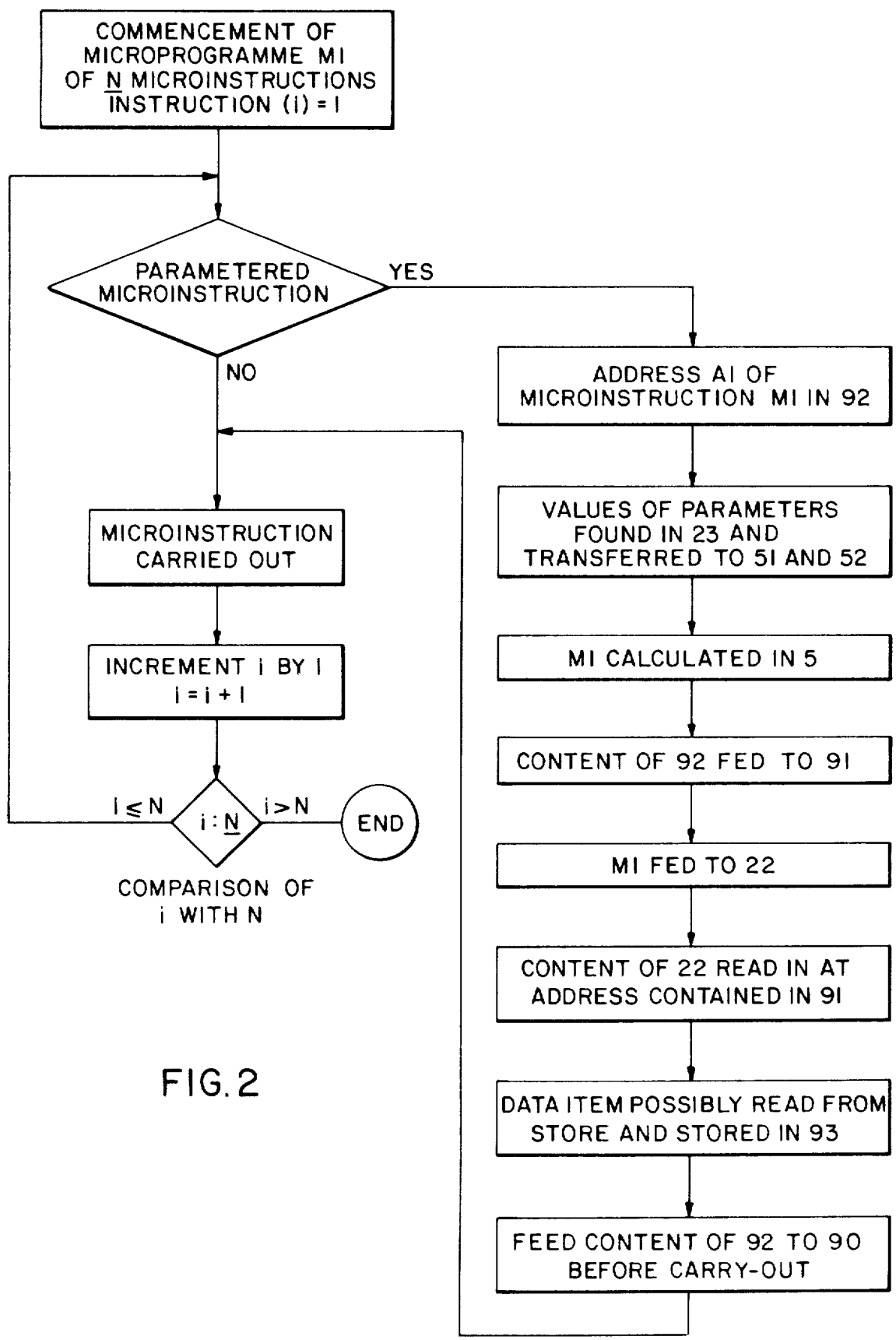
FIG. 2 is a flow-diagram illustrating the processing of a parametered microinstruction.

FIG. 2 is a flow diagram of an alternative method in which a data item is read from table 23 into register 93, but is not used as part of the calculated microinstruction. For example, register 93 would be used to store data intended for storage in a register identified by $A_0$ - - - $A_7$.

The invention is thus in no way limited to the embodiment which has been described solely as an illustration, but covers all the technical equivalents of the means described if these are produced within its spirit and are employed within the scope of the following claims.

What is claimed is:

1. A method of recording and carrying out microprograms in a processor associated with a data processing system in which a microprogram recorded in a read/write store belonging to the processor contains microinstructions which are to be carried out sequentially with the aid of a data table store, comprising the steps of:
    providing a storage location for a parametered microinstruction containing a first parameter and a second parameter at a predetermined address in the read/write store;
    storing in the data table store a first value corresponding to the first parameter and a second value corresponding to the second parameter;
    combining the first and second values extracted from the data table store to form a calculated microinstruction;
    storing the calculated microinstruction in the read/write store at the predetermined address; and
    executing the calculated microinstruction.

2. A method according to claim 1 wherein the processor includes a logic and arithmetic unit comprising a first operand register and a second operand register and wherein the step of combining the first and second values comprise the steps of:
    transmitting the predetermined address to an auxiliary address register;
    reading the first and second values from the store;
    transmitting the first value into the first operand register and the second value into the second operand register; and
    combining the first and second values in the logic and arithmetical unit to form the calculated microinstruction.

3. A method according to claim 1, wherein the processor comprises a data address register for storing the addresses of data to be read from or into the read/write store, the output of the data address register being connected to the selector circuits of the read/write store, and wherein the step of storing the calculated microinstruction in the read/write store comprises the step of transferring the predetermined address from the auxiliary register into the data address register, so that the calculated microinstruction from the logic and arithmetical unit can be read into the store.

4. A method according to claim 1, wherein the processor comprises a working register, wherein the parametered microinstruction comprises a third parameter, wherein the data table stores a third value corresponding to the third parameter, and wherein the method further comprises the step of reading out said third value from the data table into the working register before the calculated microinstruction is stored in the read/write store.

5. Apparatus for recording and carrying out microprograms in a processor associated with a data processing system, said apparatus comprising:
    read/write store means for providing at a first predetermined address a storage location for at least one parametered microinstruction containing a first parameter and a second parameter, for storing at a second predetermined address a first value corresponding to the first parameter, and for storing at a third address a second value corresponding to the second parameter;
    microinstruction address register means including outputs connected to the store means for storing the first, second and third predetermined addresses;
    calculating means for combining the first and second values to form a calculated microinstruction capable of being executed; and
    control means for reading the first and second values into the calculating means in response to the presence of the second and third predetermined addresses in the address register means so that the calculated microinstruction is formed, and for writing the calculated microinstruction into the store means at the first predetermined address, whereby the calculated microinstruction can be executed.

6. Apparatus according to claim 5, wherein the calculating means comprise:
    an arithmetical and logic unit including first operand register means for storing the first value and second operand register means for storing the second value.

7. Apparatus according to claim 6, wherein the microinstruction address register means comprise:
    a first register for storing the first predetermined address; and
    a second register for storing the second and third predetermined addresses.

8. Apparatus according to claim 7, wherein the microinstruction address register means further comprises an auxiliary register having an input connected to the output of the first register and having an output connected to the input of the second register for storing the first predetermined address.

9. Apparatus according to claim 8, wherein the connection between the output of the auxiliary register and the input of the second register is made selectively conductive to allow the calculated microinstruction to be written into the store means.

10. Apparatus according to claim 8, wherein the output of the first register is connected to the input of the auxiliary register by a connection which is made selectively conductive when the microinstruction to be carried out is a parametered microinstruction.

11. Apparatus according to claim 8, wherein the connection between the output of the auxiliary register and the input of the first register is made selectively conductive to allow the calculated microinstruction which has been written into the store means to be executed.

12. Apparatus according to claim 11 and further comprising:

input/out register means for storing digital signals that are written into or read out of the store means; and a register connected to the input/putput register means for storing any additional data required to carry out a microinstruction.

* * * * *